United States Patent

[11] 3,591,716

[72] Inventor Howard F. Jirka
Riverside, Ill.
[21] Appl. No 749,453
[22] Filed Aug. 1, 1968
[45] Patented July 6, 1971
[73] Assignee Zenith Radio Corporation
Chicago, Ill.

[54] AUTOMATIC FREQUENCY CONTROL CIRCUIT
7 Claims, 4 Drawing Figs.

[52] U.S. Cl. .......... 178/7.3, 178/69.5, 325/420, 331/20, 331/34
[51] Int. Cl. .......... H04n 5/44
[50] Field of Search .......... 178/5.8 A, 5.8 F, 7.3, 7.5, 69.5 TV, 69.5 CB, 5.4 SY; 325/420, 418, 419; 302/271, 295; 328/72, 73, 134, 155; 331/20, 34, 36, 8, 175, 176, 177

[56] References Cited
UNITED STATES PATENTS
2,708,739 5/1955 Bucher .......... 332/29
3,319,179 5/1967 Hepner .......... 331/8

*Primary Examiner*—Robert L. Richardson
*Attorneys*—Francis W. Crotty and Cornelius J. O'Connor

ABSTRACT: An automatic frequency control circuit for an oscillator having a frequency determining circuit includes a capacitor which is coupled across the frequency determining circuit by a switching device. The operating period of the switching device is controlled by a constant current source. A control signal, developed by a phase detector, is coupled to an input terminal of the constant current source to adjust the operating period of the switching device.

By [signature] Attorney

AUTOMATIC FREQUENCY CONTROL CIRCUIT

This invention relates to an automatic frequency control arrangement for an alternating signal generator. The invention finds particular utility as a frequency control circuit for a signal generator in a television receiver.

It is common practice to provide an automatic frequency control circuit for the horizontal sweep generator in a television receiver and, in color television receivers, it is common to also provide the color reference signal generator of the color demodulator system with an automatic frequency control circuit. It is the function of these AFC circuits to maintain the output of their associated signal generators in precise phase correlation with synchronizing signals borne by the received television signal.

The signal generators used in the horizontal sweep and color demodulating systems of a television receiver conventionally comprise a free running oscillator having a reactive frequency determining circuit which is primarily determinative of the operating frequency of the oscillator. In a known prior art AFC system the resonant frequency of the frequency determining circuit is adjusted by an auxiliary capacitor. This capacitor is serially arranged with a variable impedance network which combination is coupled across at least a portion of the frequency determining circuit. The influence of the auxiliary capacitor on the resonant frequency of the frequency determining circuit is determined by this network, the impedance of which is controlled by an error signal representative of the extent the oscillator output signal departs from a predetermined phase relationship to its synchronizing signal.

In prior art AFC circuits the variable impedance has taken the form of an active device such as a vacuum tube or a transistor. In either case the impedance developed by the device varies as a function of the error signal applied thereto thus, in effect, permitting the error signal to determine the influence of the capacitor on the frequency determining circuit.

While these prior art variable impedance arrangements have proved serviceable they also tend to exhibit a power loss over a portion of their operating range. For example, if a tube or transistor device is operated in either an open circuit condition or a condition of saturation, then the device consumes substantially no power. However, between these extremes the device operates over the knee of its characteristic curve so that its performance then resembles that of a resistor which, of course, is a power consuming device. It has been observed that when variable impedance devices are operated in this fashion they tend to load the oscillator tuned circuit thereby reducing its output and, in some cases, load the circuit to such an extent as to actually disable the oscillator.

It is therefore a general object of the invention to provide an improved automatic frequency control circuit for an alternating signal generator.

It is also an object of the invention to provide an AFC circuit which overcomes the limitations of prior art circuits.

It is a specific object of the invention to provide an AFC circuit for controlling the oscillator in the horizontal scanning system of a television receiver.

It is also a specific object of the invention to provide an AFC circuit for controlling the color reference oscillator in the chrominance demodulator of a color television receiver.

In accordance with the invention an automatic frequency control circuit for a signal generator having a frequency determining circuit comprises a capacitor having a pair of electrodes, one of which is coupled to one terminal of the frequency determining circuit. Means, including a switching device having a controllable operating period, are provided for coupling the other capacitor electrode to a second terminal of the frequency determining circuit to alter the resonant frequency of that circuit during the operating period of the switching device. A constant current source is included which has an input terminal and a pair of output terminals that are coupled to the switching device. Means are provided for developing a control signal indicative of the deviation in frequency of the output signal of the signal generator from that of a reference signal and means are further provided for coupling the control signal to the input terminal of the constant current source for adjusting the operating period of the switching device.

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements and in which:

Figures 1, 2, 3, 3A:
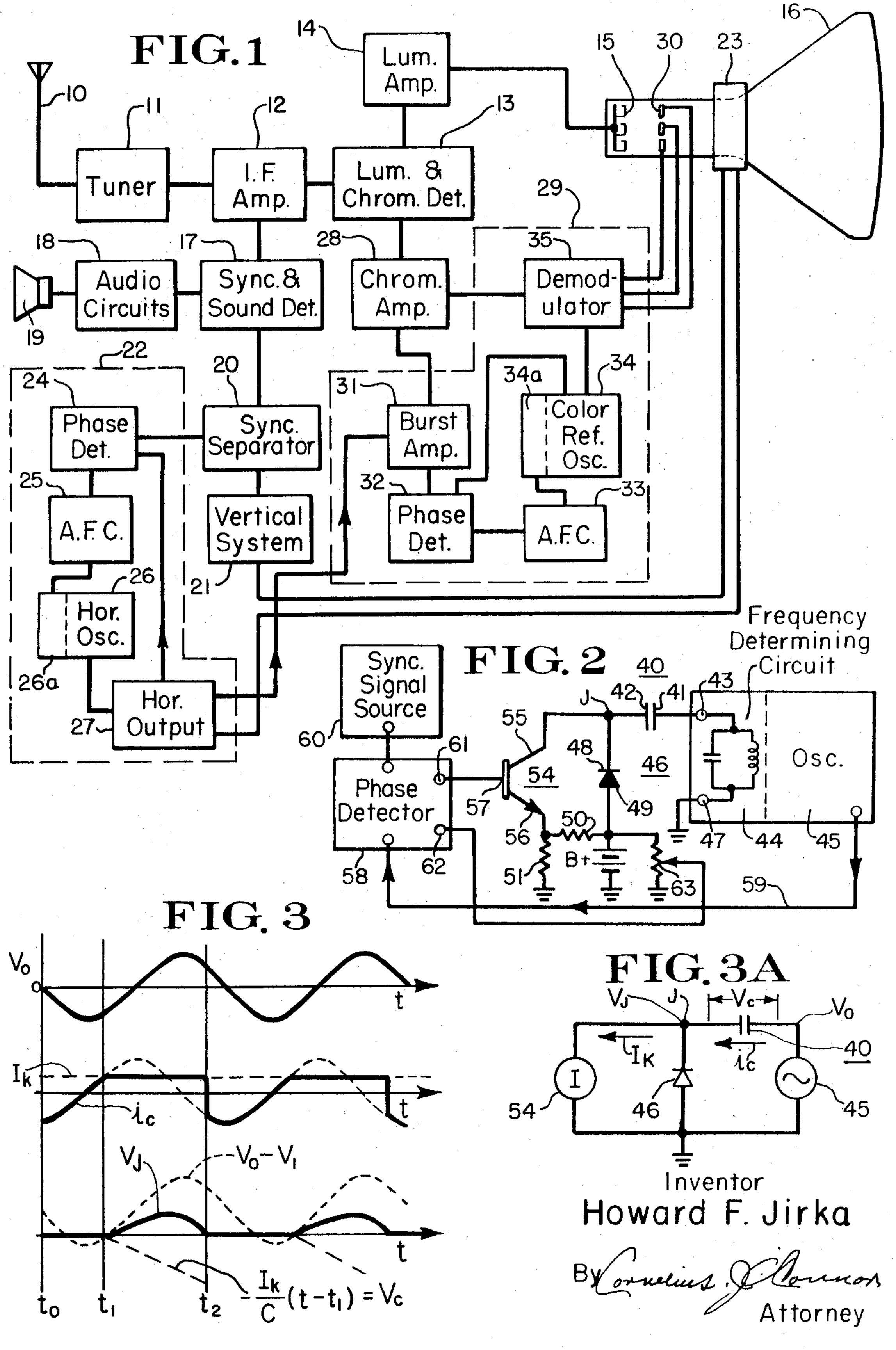
FIG. 1 is a block diagram of a color television receiver in which the present invention may be advantageously employed.
FIG. 2 is a schematic diagram of an automatic frequency control circuit for use in the television receiver of FIG. 1.
FIG. 3 depicts a group of voltage and current curves helpful in an understanding of the invention.
FIG. 3A is an equivalent circuit of the AFC circuit shown in FIG. 2.

Except for an AFC system utilizable with the horizontal scanning signal generator or the color reference signal generator, or both, the television receiver depicted in FIG. 1 is conventional in design and therefore only a brief description of its structure and operation is deemed necessary. Accordingly, a received signal intercepted by antenna 10 is coupled to a tuner 11 that includes the usual radio frequency amplifying an heterodyning stages for translating the received signal to an intermediate frequency (IF) signal. After amplification by an IF amplifier 12 the signal is applied to a luminance and chrominance detector 13 wherein luminance and chrominance information in the form of a composite video signal is derived. The luminance component is amplified in an amplifier 14 and then applied simultaneously to the cathodes 15 of a three gun color image reproducing cathode-ray tube 16.

The output of IF amplifier 12 is also applied to a sound and sync detector 17 which develops a composite video frequency signal that includes both sound and synchronizing components. The sound components are applied to audio circuits 18 wherein conventional sound demodulation and amplification circuitry develop an audio output signal suitable for driving a loud speaker 19.

Synchronizing signals, in the form of vertical and horizontal sync pulses, are derived from the output signal of detector 17 by a sync signal separator 20 and applied to vertical and horizontal deflection systems 21, 22 respectively, which systems utilize these pulses to generate vertical and horizontal sawtooth scanning currents that drive a deflection yoke 23 associated with cathode-ray tube 16.

Since the horizontal deflection system 22 constitutes one stage in the television receiver in which the subject invention can be employed, the several constituents of system 22 are broken down into block diagram form to facilitate a subsequent description and understanding of the manner in which the invention is applicable thereto. Horizontal deflection system 22 includes a phase detector 24, an automatic frequency control circuit 25 which can comprise an embodiment of the invention detailed below, a horizontal oscillator 26 having a controllable frequency determining circuit **26*a* and a horizontal output stage 27, all connected in cascade. Phase detector 24 has an input terminal connected to sync separator 20 for receiving horizontal sync pulses. A portion of the output of the horizontal deflection system is fed back to a second input terminal of the phase detector to permit it to develop, in known fashion, an error or control signal representative of the phase difference, if any, the oscillator output signal bears to the horizontal sync pulse. AFC circuit 25 applies the phase detector output signal to the frequency determining circuit 26*a*** of the oscillator in such a way as to maintain the oscillator output in synchronism with the horizontal sync pulses. The synchronized oscillator then drives output stage 27 in a conventional manner to develop horizontal scanning currents.

The chrominance components of the composite video output signal of detector 13 are applied to a chrominance amplifier 28 which is coupled to a color demodulator system 29 that derives three color signals R–Y, B–Y, and G–Y. These signals are coupled to assigned ones of control electrodes 30 include in the beam generating guns of cathode-ray tube 16 to develop, in concert with the luminance signal applied to cathodes 15, a color image.

The color demodulator system is still another environment in which the subject invention finds utility. As seen in FIG. 1, demodulator system 29 includes a burst amplifier 31 which, upon receipt of a gating signal from the horizontal output stage 27, amplifies a 3.58 MHz. synchronizing signal derived in chrominance amplifier 28 and applies this sync signal to a phase detector 32. An AFC circuit 33, which can also constitute an embodiment of the invention, is interposed between phase detector 32 and the frequency determining circuit 34*a* of a color reference local oscillator 34. The latter generates, a 3.58 MHz. signal which is employed to demodulate the chrominance signal components of the composite video signal.

Detector 32 serves to compare the phase of the burst sync signal with a sample of the 3.58 MHz. carrier signal fed back from reference oscillator 34. If the phase of the oscillator output departs from a predetermined relationship to the sync signal, an error or control signal is developed and applied to AFC circuit 33 which, in turn, applies a correction signal to oscillator frequency determining circuit 34*a* to bring the oscillator into synchronism with the received burst signal. Stabilized in this fashion, the output of oscillator 34, together with a composite video signal from chrominance amplifier 28, are applied to a demodulator arrangement 35, of a known type, capable of developing color control signals for application to electrodes 30 of cathode-ray tube 16.

Attention is now addressed to a new and improved AFC circuit that finds particular utility in the color television receiver of FIG. 1. Referring specifically, to FIG. 2, the subject AFC circuit comprises a capacitor 40 having a first electrode 41 that is coupled to one terminal 43 of the frequency determining circuit 44 of an oscillator 45 that develops an alternating output signal of controllable phase and frequency. Circuit 44 may comprise the parallel tuned resonant circuit shown, or a series tuned circuit or even a crystal controlled arrangement of the type frequently used with color reference oscillators. A second terminal 42 of capacitor 40 is connected to a junction J. A switch 46, comprising a unilaterally conductive device having a controllable operating or conduction period, couples capacitor electrode 42 to a second terminal 47 of frequency determining circuit 44 during the operating period of the device. more particularly, switch 46 comprises a diode having a cathode 48 connected to capacitor electrode 42 via junction J and an anode 49 that is returned to terminal 47 of frequency determining circuit 44 through a source of unidirectional potential which is disclosed as a battery and designated B+. As shown, terminal 47 is connected to a plane of reference potential, as is the negative terminal of battery B+. A voltage divider comprising a pair of series disposed resistors 50, 51 is connected across the terminals of the battery.

The AFC circuit of FIG. 2 further includes a constant current source 54 having a pair of output terminals coupled to switch 46 and an input terminal. In the disclosed embodiment of the invention source 54 comprises an NPN transistor having a collector electrode 55, which is connected to junction J, the terminal common to diode cathode 48 and capacitor electrode 42, and an emitter 56, which is connected to the juncture of resistors 50, 51. Collector 55 and emitter 56 constitute the output terminals for source 54 while a base electrode 56 and emitter 56 serve as input terminals for the source.

Means are provided for developing a control signal which is indicative of the phase deviation of the output signal of oscillator 45 from that of a reference signal. More particularly, a phase detector 58 monitors a portion of the RF output of oscillator 45 by virtue of a feedback coupling afforded by connection 59 and compares it to a synchronizing signal supplied by sync signal source 60 to develop a control or error signal at its output terminals 61, 62. Phase detector terminal 61 is connected to base electrode 57 of transistor 54 while detector terminal 62 is returned to reference potential through a biasing network comprising a variable resistor 63 which is connected across battery B+ and serves as a frequency control to adjust the free running frequency of oscillator 45. The phase detector control signal is applied to input terminals 57, 56 of the constant current source 54 to establish, in conjunction with a biasing potential from voltage divider 50, 51, a predetermined level of output current for source 54. Since switching diode 46 is included in the emitter-collector path of the source it is current biased by the source. As a result the diode is afforded a controllable operating or conduction period, which period is a function of the magnitudes of source 54 current and oscillator current. The conduction period, of course, depends upon the current level established in source 54 by the control signal and the magnitude of oscillator current. Thus, the conduction period of diode 46 can range from zero to a 360° portion of an RF cycle.

The AFC circuit of FIG. 2 basically constitutes an arrangement for switching capacitor 40 into and out of frequency determining circuit 44 of oscillator 45 to alter the resonant frequency of the oscillator. In the disclosed embodiment capacitor 40 is hunted across circuit 44 by diode 46 during the operating or conduction period of the diode so that the oscillator is switched from its initial resonant frequency to a lower frequency during such periods. The extent to which the resultant oscillator frequency differs from its initial frequency is a function, of course, of the length of time the diode is rendered conductive.

Attention is now directed to FIG. 3 in which the circuit voltages and currents of the subject AFC circuit are depicted in graphical from. More particularly, $V_o$ is a plot of the oscillator voltage appearing at terminal 43 of the frequency determining circuit while curve $i_c$ designates the oscillator current that flows through capacitor 40. The dashed line segment of the $i_c$ curve indicates the interval during which switch 46 presents an open circuit to the oscillator current. In other words, it is the period during which the diode is rendered nonconductive. $I_k$ represents the constant current that flows in the emitter-collector path of transistor 54 in response to the application of a control signal from detector 58 to the base-emitter junction of transistor 54. $V_c$ is the voltage across capacitor 40, $V_1$ is the oscillator voltage at time $t_1$, the instant that switch diode 46 opens, and $V_J$ is the voltage developed at junction J when the diode is rendered nonconductive.

In operation, the AFC circuit of FIG. 2 functions as follows. The constant current source 54 forward biases diode 46 so that oscillator current $i_c$ flowing through capacitor 40 is afforded a path to terminal 47 of frequency determining circuit 44. The magnitude of current that source 54 can sustain is fixed for any one set of bias and input control voltages, that is, the current flowing out of junction J to source 54 must always be $I_k$, see FIG. 3A. Capacitor 40, therefore, is coupled across circuit 44 by the diode only so long as the amplitude of the positive component of oscillator current flowing into junction J does not exceed the amplitude of constant current $I_k$ flowing from that junction to source 54. If the flow of oscillator current into junction J should continue to increase, in a positive direction, then a current balance at junction J would require this positive current to flow downward through the diode since the constant current device 54 cannot sustain a current exceeding $I_k$. However, since it is impossible for current to flow in a reverse direction through a diode, diode 46 becomes an open circuit at time $t_1$ and capacitor 40 discharged through source 54 to maintain the current balance at junction J.

The manner in which the subject AFC circuit operates is also demonstrable through the mathematical development set forth below:

Basically, $$V_J = V_0 - V_c \quad (1)$$

Since switch 46 is closed (conducting) at an instant just prior to $t_1$, capacitor terminal 42 is effectively connected across the oscillator frequency determining circuit so that $$V_J = 0 \quad (2)$$

and thus, $V_c = V_o$. (3)

However, at an instant $t$ just after time $t_1$ $$V_c = \frac{1}{c}\int_{t_1}^{t} i_c dt + V_1 \quad (4)$$

where $V_1$ is the value of $V_o$ at time $t_1$. Equation (1) for $V_J$ now becomes:

$$V_J = V_0 - \left(\frac{1}{c}\int_{t_1}^{t} i_c dt + V_1\right) \quad (5)$$

$$V_J = V_0 - V_1 - \frac{1}{c}\int_{t_1}^{t} i_c dt \quad (6)$$

Remembering that switch 46 becomes an open circuit an instant after $t_1$, $I_k$ defines the circuit current and since $I_k$ is constant, the last term of equation (6) becomes $$-\frac{I_k}{C}(t - t_1) = V_c \quad (7)$$

so that $$V_J = V_o - V_1 - (I_k/C)(t - t_1. \quad (8)$$

During the interval from $t_1$ to $t_2$ the capacitor sustains the current $I_k$ through source 54. By time $t_2$ the negatively increasing voltage $-(I_k/C)(t-t_1)$ across capacitor 40 has attained a magnitude equal in value but opposite in sign to that of the term $V_o - V_1$ so that the voltage $V_J$ becomes zero. Diode switch 46 thereupon closes and the switching cycle repeats.

While the embodiment of the invention depicted in FIG. 2 utilizes a diode as a switching device, it is recognized that other unilaterally conductive devices can also be employed. For example, either the base-emitter or the base-collector path of a transistor can be substituted for the disclosed diode in an application where the transient response or other characteristic of a transistor makes it more suitable than a diode for achieving a particular switching action. It is also appreciated that a transistor other than the disclosed NPN device can be employed. For example, a PNP transistor can be substituted for the transistor disclosed by simply reversing the polarity of the biasing arrangement. Likewise, the constant current source is not limited to a conventional bipolar transistor, a filed effect or other type transistor could also be utilized as well as a vacuum tube, e.g., a pentode.

In an actual utilization of the subject invention an AFC circuit was constructed for use with the color reference oscillator of a color television receiver. This AFC circuit employed a Fairchild FD-333 diode as a switching device and a Fairchild SE4010 NPN bipolar transistor as a constant current source. A 22 picofarad capacitor served as the reactive element that was switched into and out of circuit with the frequency determining circuit of the reference oscillator. The constant current source was biased by a 24 volt DC source across which a voltage divider comprising a 3.9K ohm resistor and a 10K ohm resistor were employed for resistors 50, 51, respectively. Resistor 63 comprised a 100K ohm resistor.

With appropriate regard for biasing and impedance matching considerations, the AFC circuit described above is equally suitable for use in the AFC circuit 25 of the horizontal deflection system in the television receiver of FIG. 1.

In summary of AFC circuit has been described which finds application, with equal facility, in either the horizontal deflection system of a television receiver or in the color demoulating system of a color television receiver. The disclosed AFC circuit, by resort to a novel arrangement of a constant current source, a switching device and a reactive impedance element, serves to adjust the frequency of an oscillator associated therewith without imposing a power loss upon the oscillator to the detriment of its performance.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. An automatic frequency control circuit for a signal generator having a frequency determining circuit, comprising:
   - a capacitor having a first electrode coupled to one terminal of said frequency determining circuit and also having a second electrode;
   - means, including a single switching device having a controllable operating period fully adjustable over a range from 0° to 360° conduction during each cycle of said signal generator, for coupling said second capacitor electrode to a second terminal of said frequency determining circuit during the operating period of said device;
   - a constant current source having an input terminal and also having a pair of output terminals coupled across said switching device;
   - means independent of said signal generator for energizing said constant current source;
   - means for developing a control signal indicative of the deviation in frequency of the output signal of said signal generator from that of a reference signal;
   - and means for coupling said control signal to said input terminal of said constant current source for controlling the operating period of said switching device to alter the resonant frequency of said frequency determining circuit.

2. An automatic frequency control circuit as set forth in claim 1 in which said switching device comprises a unilaterally conductive device.

3. An automatic frequency control circuit as set forth in claim 2 in which said unilaterally conductive device comprises a diode having a cathode coupled to said second capacitor electrode and an anode coupled to said second terminal of said frequency determining circuit.

4. An automatic frequency control circuit as set forth in claim 1 in which said constant current source comprises a transistor having emitter and collector electrodes coupled across said switching device.

5. An automatic frequency control circuit as set forth in claim 1 which further comprises a source of reference signals and in which said means for developing a control signal comprises a phase detector coupled to said source of reference signals and to said signal generator.

6. An automatic frequency control circuit as set forth in claim 1 in which said signal generator comprises the horizontal oscillator of a television receiver and said frequency determining circuit comprises a tuned resonant circuit.

7. An automatic frequency control circuit as set forth in claim 1 in which said signal generator comprises the color reference oscillator of a color television receiver.